Oct. 18, 1938.  D. R. BOMFORD ET AL  2,133,653
VEHICLE PROVIDED WITH ENDLESS OR SELF LAYING TRACKS
Filed May 20, 1937  2 Sheets-Sheet 1
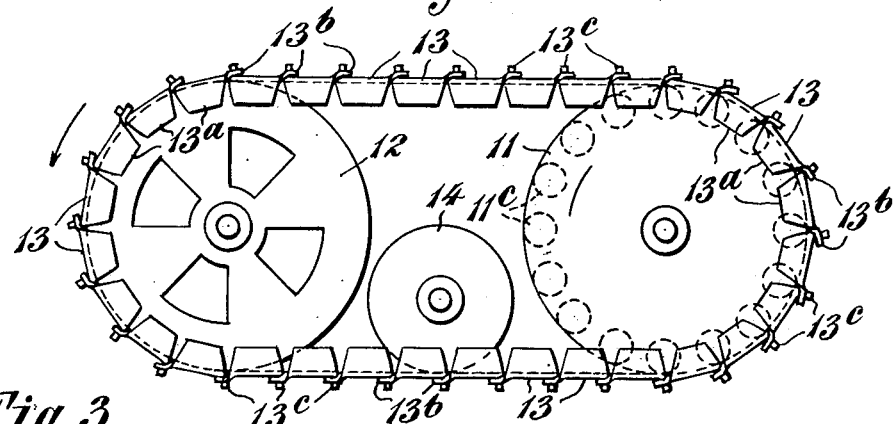
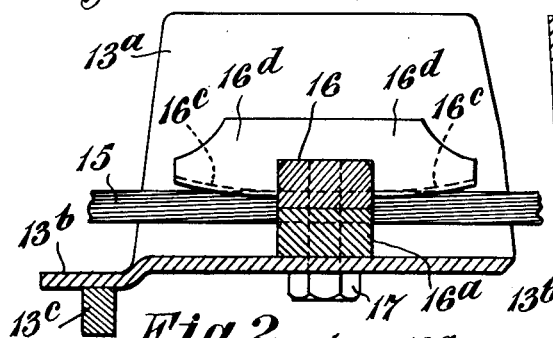
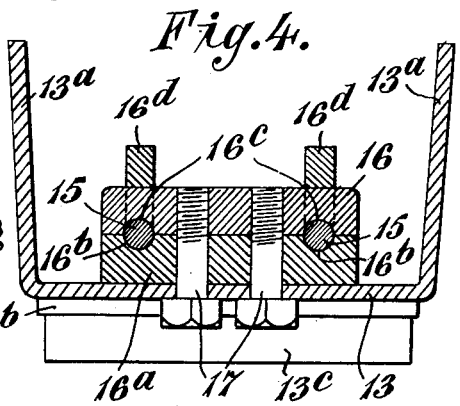
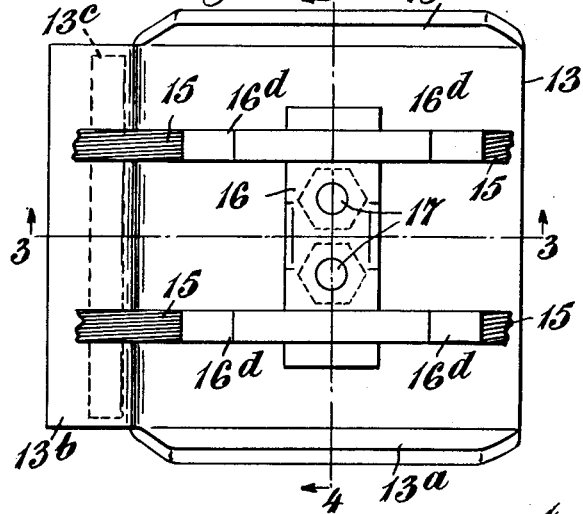
Inventors:- Douglas Raymond Bomford.
Ernest Raymond Bomford.
Per:- George E. Folkes
Attorney.

Oct. 18, 1938.  D. R. BOMFORD ET AL  2,133,653
VEHICLE PROVIDED WITH ENDLESS OR SELF LAYING TRACKS
Filed May 20, 1937   2 Sheets-Sheet 2
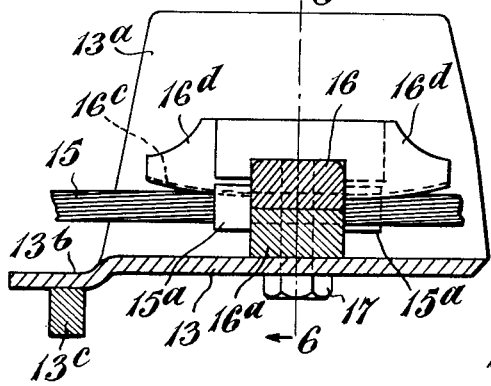
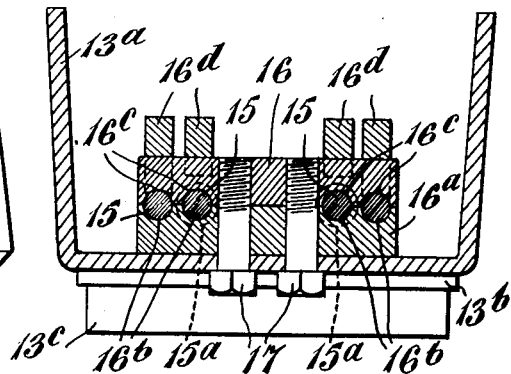
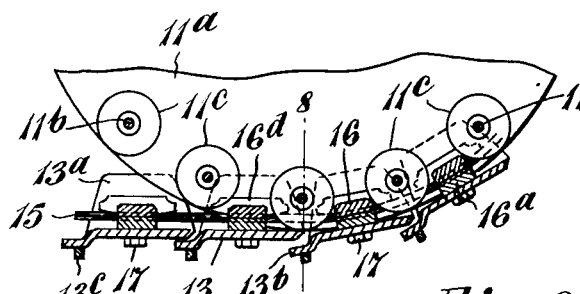
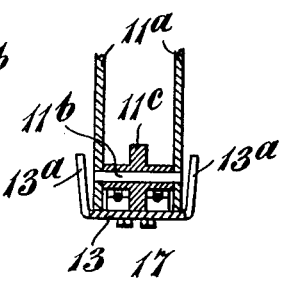
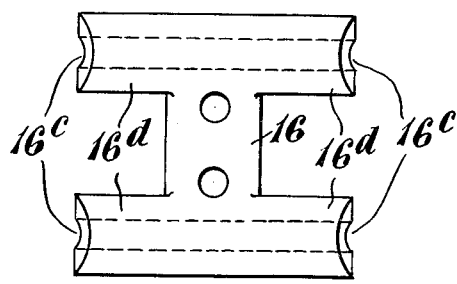
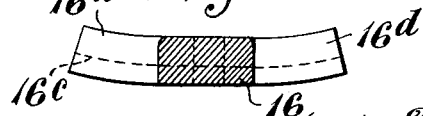
Inventors: Douglas Raymond Bomford.
Ernest Raymond Bomford.
Per:— George E. Folkes
Attorney.

Patented Oct. 18, 1938

2,133,653

UNITED STATES PATENT OFFICE 2,133,653

VEHICLE PROVIDED WITH ENDLESS OR SELF-LAYING TRACKS

Douglas Raymond Bomford and Ernest Raymond Bomford, Pitchill, Evesham, England

Application May 20, 1937, Serial No. 143,824
In Great Britain November 21, 1936

1 Claim. (Cl. 305—10)

This invention relates to tractors and other vehicles provided with what are technically known as "endless-tracks" or alternatively as "self-laying tracks", the term "endless-tracks" being hereinafter used for preference.

The invention is more particularly concerned with the construction of the tracks for such vehicles, which tracks as is well understood ordinarily embody a series of plate-like members, commonly termed tread-plates, mounted on and carried by substantially inextensible metallic bands or cables the respective ends of which are brought together and interconnected to form loop-like members which with the tread plates mounted thereon constitute an endless track one end of which passes over a sprocket wheel adapted to co-act with a part on the tread plates for effecting the travelling motion of the track over the said sprocket and over an idle or guiding wheel over which the other end of the endless track passes, a small roller or a plurality of such rollers being usually provided to bear on the track intermediate the driving sprocket and the idle or guiding wheel in a manner and for the purpose well understood.

This invention has for its object to provide endless-track mechanism for tractors and other vehicles, more simple in construction and efficient in operation than endless-track mechanisms as heretofore constructed.

The present invention is characterised in that the endless track embodies a series of tread plates of channel-like formation each tread plate having in combination therewith means whereby it may be directly clamped to a plurality of stranded wire or like flexible members in loop-like form, the clamping means provided constituting a projection on the said plates for the engagement therewith of the teeth or equivalent parts of the driving wheel, the said clamping means also being so designed that the portions of the cables intermediate the parts whereon the successive tread plates are clamped are permitted to assume, when the said tread plates are passing over the driving wheel and the idle or guide wheel, a curvature substantially conforming to that of the said wheels, whereby wear on the parts of the cables adjoining the parts engaged by the clamping means is reduced to a minimum.

The invention further resides in certain details of construction to be hereinafter more particularly referred to and illustrated by the accompanying drawings with reference to which the invention will now be described.

Figure 1 of the drawings represents, more or less diagrammatically in side elevation, an endless track in accordance with the invention the co-acting wheels only of the tractor or vehicle to which the track is applied being shown in the said figure, and it will be appreciated that these tracks are, as usual, provided at both sides of the vehicle.

Figure 2 is a plan view showing one of the tread plate members separately with parts of the cables to which it is attached.

Figures 3 and 4 respectively represent sections of the same on the planes indicated by the dotted lines 3—3 and 4—4 in the said Figure 2.

Figures 5 and 6 are similar views to Figures 3 and 4 illustrating a convenient method for effecting the anchorage of the free ends of the flexible cables to one of the tread plates.

Figure 7 is a view showing in longitudinal section a portion of the track and a fragmentary part of a driving wheel of a construction hereinafter more particularly described, which may be used on vehicles provided with tracks in accordance with this invention.

Figure 8 is a transverse section on the plane indicated by the dotted line 8—8, Figure 7.

Figures 9 and 10, represent in plan and sectional side elevation respectively, a modified construction of the clamping member hereinafter more particularly referred to.

In the said Figure 1 of the drawings the reference numbers 11 and 12 respectively denote a driving sprocket, which may be of the construction hereinafter more particularly described, and a guide wheel over which the endless track, embodying a series of tread plates which are denoted generally by the reference 13, is adapted to travel in the operation of the tractor or the like furnished with the said endless track while 14 denotes a loading roller adapted to act on the track at a part thereof intermediate the said driving and guide wheels 11 and 12.

In the convenient embodiment of the invention illustrated the tread plates 13 are mounted directly on and carried by a pair of flexible metallic cables 15, the said cables being preferably of stranded wire and being spaced apart in parallel planes a sufficient distance to permit the teeth or equivalent parts of the driving sprocket 11 to work between them.

Each of the tread plates 13, which plates have side flanges 13ª which give them a channel-like formation, has in conjunction therewith means for effecting its attachment directly to the cables 15 the said means comprising two blocks, marked 16 and 16ᵃ respectively which co-act to provide on the inner face of the bottom of the channel-like tread plate a bearing and clamp wherein those portions of the parallel cables 15 whereon each tread plate is located are adapted to be securely gripped.

The block 16ᵃ, which is hereinafter referred to as the inner block, may be formed integral with the channel-like tread plate 13 or it may be made separate therefrom and if desired welded or otherwise secured to the inner face thereof and the said block is of such width in the transverse direction of the plate as to leave sufficient space between the longitudinal sides of the block and the inner faces of the channel sides 13ᵃ to permit the passage between them of the peripheral parts of the driving wheel 11, guiding wheel 12 and loading roller 14.

The upper face of this inner block 16ᵃ is furnished with two longitudinally extending parallel grooves 16ᵇ of substantially semi-circular figure in cross section and spaced apart at the requisite distance to receive the flexible cables 15.

The block 16 which co-acts with the said inner block 16ᵃ to constitute the bearing and clamp for the cables, which block 16 is hereinafter referred to as the outer block, has in the inner face of the part thereof which is located on the inner block grooves 16ᶜ coinciding with the grooves 16ᵇ in the upper face of the inner block and the said outer block 16 is furnished at or adjacent each corner thereof with a longitudinally directed projection 16ᵈ into and along which the said grooves 16ᶜ in its inner face extend. The grooves 16ᶜ in the portions thereof which extend into and along the said projections 16ᵈ on the outer block are given such a curvature as will permit the portions of the cables whereover the said projections 16ᵈ are located to conform, when the tread plates of the track are passing over the sprocket and supporting wheels 11 and 12, to the curvature or substantially to the curvature of the said wheels, the curved extensions of the grooves 16ᶜ acting to prevent wear on the cables at the parts adjacent the portions gripped between the clamping blocks.

Where the extensions 16ᵈ are made separate from the block 16 they may be formed from suitably shaped pieces of bar metal which may be secured to the blocks by welding or otherwise secured thereto and when they are formed integral with the block the said block is made by casting, the casting having the form shown in plan in Figure 9 and sectional side elevation in Figure 10 of the drawings.

The outer block 16 is drawn into the clamping position on the cables 15 by a screw bolt, or preferably a plurality of screw bolts 17, which may be passed upwardly through holes provided in the bottom of the tread plate 13 and coincident bores in the inner block 16ᵃ their screwed ends taking into tapped holes provided for their reception in the outer block 16.

The free ends of the flexible cables 15 may be anchored to a shoe or tread plate 13 which, as is illustrated by Figures 5 and 6, is provided with co-acting clamping blocks 16 and 16ᵃ each having two pairs of grooves marked respectively 16ᶜ and 16ᵇ in their presented faces in which grooves the respective ends of the cables 15 can be laid in overlapping relationship, the cable ends projecting beyond the ends of the inner block 16ᵃ and having ferrules 15ᵃ fixed thereon which ferrules when the outer block 16 is secured in place prevent the cable ends being drawn from the clamp by any longitudinal strain thereon.

The sprocket or driving wheel may be furnished with tooth-like parts suitably shaped for engaging with the clamping members 16, 16ᵃ described and having a width which will permit them to pass between the corner lugs or projections 16ᵈ on the outer block 16 into the necessary engagement.

Or in lieu of employing a driving wheel having tooth-like parts for co-acting with the projections on the tread plates formed by the clamping blocks 16, 16ᵃ the said driving wheel may be constituted as is shown in the drawings by a pair of parallel circular plates 11ᵃ spaced apart and connected to each other by a series of pins 11ᵇ which extend horizontally and at equi-distant points around and between the presented faces of the discs 11ᵃ and provide spindles for rollers 11ᶜ which act on the projections formed by the cable clamping means on the tread plates to effect the travelling motion of the endless track.

The guiding wheel 12 and bearing roller 14 are formed by spaced apart discs or otherwise so formed that their peripheries can occupy the spaces between the sides 13ᵃ of the tread plates and the projections formed by the clamping means for the cables, and bear against the bottoms of the said tread plates.

The transverse rear edges of the tread plates, regarded in relation to the direction in which they travel, are preferably slightly cranked as shown at 13ᵇ so that the said edges may overhang the forward edge of the next succeeding tread plate and the parts thus cranked may have on their outer faces an outwardly projecting transverse rib 13ᶜ, the said ribs acting as tynes.

It is to be understood that we do not limit ourselves to the employment of two flexible cables only as the number of such cables employed in the construction of the track may be increased if desired and further in lieu of wire cables narrow bands of spring steel or laminations thereof may be employed, the cross sectional shape of the grooves 16ᵇ and 16ᶜ in the clamping members 16ᵃ and 16 respectively being modified accordingly.

We claim:—

An endless track for tractors and other vehicles adapted for endless track propulsion the said track embodying in combination a plurality of flexible metallic members of endless loop-like formation, a series of tread plates of channel-like form in transverse section and disposed in contiguity and cross-wise on the said flexible endless loop-like members, each tread plate having in conjunction therewith an outer block longitudinally grooved to provide seatings for the portions of the flexible members on which the tread plate is located and an inner block correspondingly grooved and coacting with the outer block to clamp the tread plate to the flexible members, the said outer block being provided at or adjacent the corners thereof with longitudinally directed projections which overhang portions of the flexible members intermediate the parts to which successive tread plates are clamped, the grooves in the said outer block extending into these longitudinal projections and the parts of the said grooves in the projections being so curved as to permit the parts of the flexible members over which the projections extend to assume a curvature substantially conforming to that of the driving wheel and guide wheel over which the track passes.

DOUGLAS RAYMOND BOMFORD.
ERNEST RAYMOND BOMFORD.